(12) United States Patent
Suzuki et al.

(10) Patent No.: US 8,964,315 B2
(45) Date of Patent: Feb. 24, 2015

(54) LENS DRIVE DEVICE

(71) Applicant: TDK Corporation, Tokyo (JP)

(72) Inventors: Akira Suzuki, Tokyo (JP); Kazutomo Imi, Tokyo (JP); Masaru Uno, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/739,544

(22) Filed: Jan. 11, 2013

(65) Prior Publication Data

US 2013/0194684 A1 Aug. 1, 2013

(30) Foreign Application Priority Data

Jan. 26, 2012 (JP) ................. 2012-014481

(51) Int. Cl.
*G02B 7/02* (2006.01)
*G02B 7/04* (2006.01)
*G02B 7/08* (2006.01)
*H02N 2/00* (2006.01)
*H02N 2/02* (2006.01)

(52) U.S. Cl.
CPC .. *G02B 7/04* (2013.01); *G02B 7/08* (2013.01); *H02N 2/004* (2013.01); *H02N 2/0055* (2013.01); *H02N 2/006* (2013.01); *H02N 2/0065* (2013.01); *H02N 2/026* (2013.01)
USPC ............................ 359/823; 359/694; 359/824

(58) Field of Classification Search
CPC .......... G11B 7/0937; G02B 7/08; G02B 7/04; G02B 7/102; G02B 7/023; G02B 7/09; G02B 7/02
USPC ................................ 359/814, 823–824, 694
See application file for complete search history.

(56) References Cited

U.S. PATENT DOCUMENTS

2006/0104624 A1* 5/2006 Nakata et al. ................. 396/137
2007/0280667 A1* 12/2007 Shin .............................. 396/133
2012/0236423 A1* 9/2012 Uno et al. ..................... 359/814

FOREIGN PATENT DOCUMENTS

JP A-10-90584 4/1998
JP A-2010-233404 10/2010

* cited by examiner

*Primary Examiner* — Scott J Sugarman
*Assistant Examiner* — Daniele Manikeu
(74) *Attorney, Agent, or Firm* — Oliff PLC

(57) ABSTRACT

A lens drive device comprises a lens holder, a piezoelectric actuator, a ball member held rotatably, and an biasing member configured to apply an biasing force to the lens holder toward the piezoelectric actuator through the ball member. The lens holder has a projection projecting outward from an outer peripheral surface and extending in a direction intersecting the projecting direction and optical axis. A side wall face of the projection is formed with a groove extending along the optical axis and engaging the ball member. A position receiving the biasing force from the biasing member and a position receiving the drive force from the actuator in the lens holder oppose each other through the projection interposed therebetween.

6 Claims, 7 Drawing Sheets ical FIELD

The present invention relates to a lens drive device configured to drive a lens for a camera mounted to a mobile phone, for example.

BACKGROUND

Known as a lens drive device is one comprising a lens holder configured to hold a lens, a shaft configured to guide the lens holder, an actuator configured to move the lens holder along the shaft, and a pressure contact surface configured to contact the actuator under pressure (see, for example, Patent Literature 1: Japanese Patent Application Laid-Open No. 10-90584). In the lens drive device disclosed in Patent Literature 1, an biasing member (spring) is arranged between the lens holder and the actuator or between the actuator and a fixing part of the lens drive device in order for the actuator to contact the pressure contact surface under pressure.

SUMMARY

However, the lens drive device disclosed in Patent Literature 1 guides the lens holder through the shaft and thus causes a frictional force between the shaft and a through hole into which the shaft is inserted. This frictional force may become a resistance, so as to cause a loss in transmission of the drive force from the actuator to the lens holder, thereby making it harder to move the lens holder appropriately.

It is therefore an object of the present invention to provide a lens drive device which can efficiently transmit a drive force from an actuator to a lens holder.

The lens drive device in accordance with one aspect of the present invention comprises a lens holder configured to hold a lens, an actuator configured to apply a drive force to the lens holder so as to move the lens holder along an optical axis of the lens, first and second ball members held rotatably, and an biasing member configured to apply an biasing force to the lens holder toward the actuator through the first and second ball members; wherein the lens holder has a barrel configured to hold the lens and a projection projecting outward from an outer peripheral surface of the barrel and extending in a direction intersecting the projecting direction and optical axis; wherein the outer peripheral surface of the projection is formed with a first groove extending along the optical axis and engaging the first ball member and a second groove extending along the optical axis and engaging the second ball member; and wherein a position receiving the biasing force from the biasing member and a position receiving the drive force from the actuator in the lens holder oppose each other through the projection interposed therebetween.

In the lens drive device in accordance with one aspect of the present invention, the biasing member applies the biasing force to the lens holder toward the actuator through the first and second ball members. This can favorably keep the contact state between the lens holder and the actuator. The position to which the biasing force is applied by the biasing member and the position to which the drive force is applied by the actuator oppose each other through the projection of the lens holder interposed therebetween, so that the biasing force by the biasing member is directed to the actuator. Therefore, the biasing member is not located on the drive force transmission pass from the actuator to the lens holder, whereby losses are hard to be generated in transmission of the drive force from the actuator to the lens holder. Since the biasing force by the biasing member can be applied to the projection having high rigidity, the contact state between the lens holder and the actuator becomes better, while making it easier to transmit the drive force from the actuator to the lens holder. Since the first and second ball members engage the first and second grooves, respectively, so as to guide the lens holder along the optical axis, without using a shaft which is likely to generate a frictional force between it and a through hole as in the prior art, losses are harder to be generated in transmission of the drive force from the actuator to the lens holder in the lens drive device in accordance with one aspect of the present invention. As a result of these, the drive force from the actuator is efficiently transmitted to the lens holder.

The actuator may further comprise an element configured to generate the drive force and a flexible printed board electrically connected to the element. In this case, the flexible printed board has flexibility and thus can move so as to follow vibrations, if any, of the element. This can favorably keep the electric connection between the element and the flexible printed board.

The lens drive device may further comprise a back member configured to press the actuator, while the biasing member, the first and second ball members, the projection, the actuator, and the back member may be arranged sequentially along the direction of the biasing force by the biasing member.

The lens drive device may be constructed such that the actuator is a piezoelectric actuator having first and second main faces opposing each other and a frictional part located on the first main face side of the element and configured to apply the drive force to the lens holder; the element is deformable in an opposing direction of the first and second main faces and a direction orthogonal to the opposing direction; the back member is located on the second main face side; the piezoelectric actuator has a pair of first and second node points representing the smallest displacement in the opposing direction and a third node point, located between the first and second node points, representing the smallest displacement in the opposing direction and the smallest displacement in a direction orthogonal to the opposing direction; the back member has first to third projections projecting to the second main face; the first to third projections are pressed against the second main face at respective positions corresponding to the first to third node points when seen in the opposing direction; respective drags configured to inhibit the first to third projections from moving along the second main face are generated between the first to third projections and the second main face; and the drags generated between the first and second projections and the second main face is lower than the drag generated between the third projection and the second main face.

When seen in the opposing direction in this case, the first to third projections of the back member are pressed against the second main face at respective positions corresponding to the first to third node points. The drags generated between the first and second projections and the second main face are lower than the drag generated between the third projection and the second main face. Since the displacement in the opposing direction is the smallest at the first and second node points, while the drags generated between the first and second projections and the second main face are lower, vibrations, if any, of the piezoelectric actuator in directions orthogonal to the opposing direction are hard to be inhibited by the first and second projections. Since the third node point represents the smallest displacement in the opposing direction and the smallest displacement in a direction orthogonal to the opposing direction, vibrations of the piezoelectric actuator are hard to be inhibited by the third projection even when the drag generated between the third projection and the second main face is higher. Since three projections, i.e., the first to third ones, are pressed against the second main face, the frictional part can be brought into uniform contact with the lens holder. This makes it possible to transmit the drive force more efficiently from the piezoelectric actuator to the lens holder and drive the piezoelectric actuator with high accuracy.

The lens drive device may further comprise a housing configured to contain the lens holder, the actuator, and the biasing member; the actuator may be arranged at a first corner of the housing; the biasing member may be arranged at a second corner of the housing adjacent to the first corner; the projection may have a pair of first and second surfaces opposing each other in the extending direction of the projection; the first and second surfaces may be located at the first and second corners, respectively; the actuator may provide the drive force toward the first surface; and the biasing member may provide the biasing force toward the second surface. In this case, the actuator and biasing member are arranged at corners which form dead spaces in the housing. The drive force is provided by the actuator within the first corner, while the biasing force is provided by the biasing member within the second corner. Therefore, even when the lens holder becomes larger, areas for members configured to provide the drive force and biasing force are secured in dead spaces, whereby the drive force and biasing force are not inhibited from being applied to the lens holder. Hence, the lens holder and the lens drive device can be made larger and smaller, respectively, at the same time. As a result, when the lens holder is configured such as to have a size on a par with the conventional one, a smaller lens drive device can be obtained. When the lens drive device is configured such as to have a size on a par with the conventional one, on the other hand, the lens holder can be made larger, whereby a lens having a larger diameter can be mounted to the lens holder.

The biasing member may have a first holding hole configured to rotatably hold the first ball member and a second holding hole configured to rotatably hold the second ball member. In this case, members configured to hold the first and second ball members can be integrated with the biasing member. This can reduce the number of parts, thereby contributing to saving the space.

The present invention can provide a lens drive device which can efficiently transmit a drive force from an actuator to a lens holder.

The present invention will be more fully understood from the detailed description given herein below and the accompanying drawings, which are given by way of illustration only, and thus are not to be considered as limiting the present invention.

BRIEF DESCRIPTION OF THE DRAWINGS

FIG. 3(a) is a top plan view illustrating a body of a piezoelectric actuator body, while FIG. 3(b) is a side view illustrating the piezoelectric actuator;

DETAILED DESCRIPTION

Preferred embodiments of the present invention will be explained with reference to the drawings. In the explanation, the same constituents or those having the same functions will be referred to with the same signs while omitting their overlapping descriptions.

Figure 1:
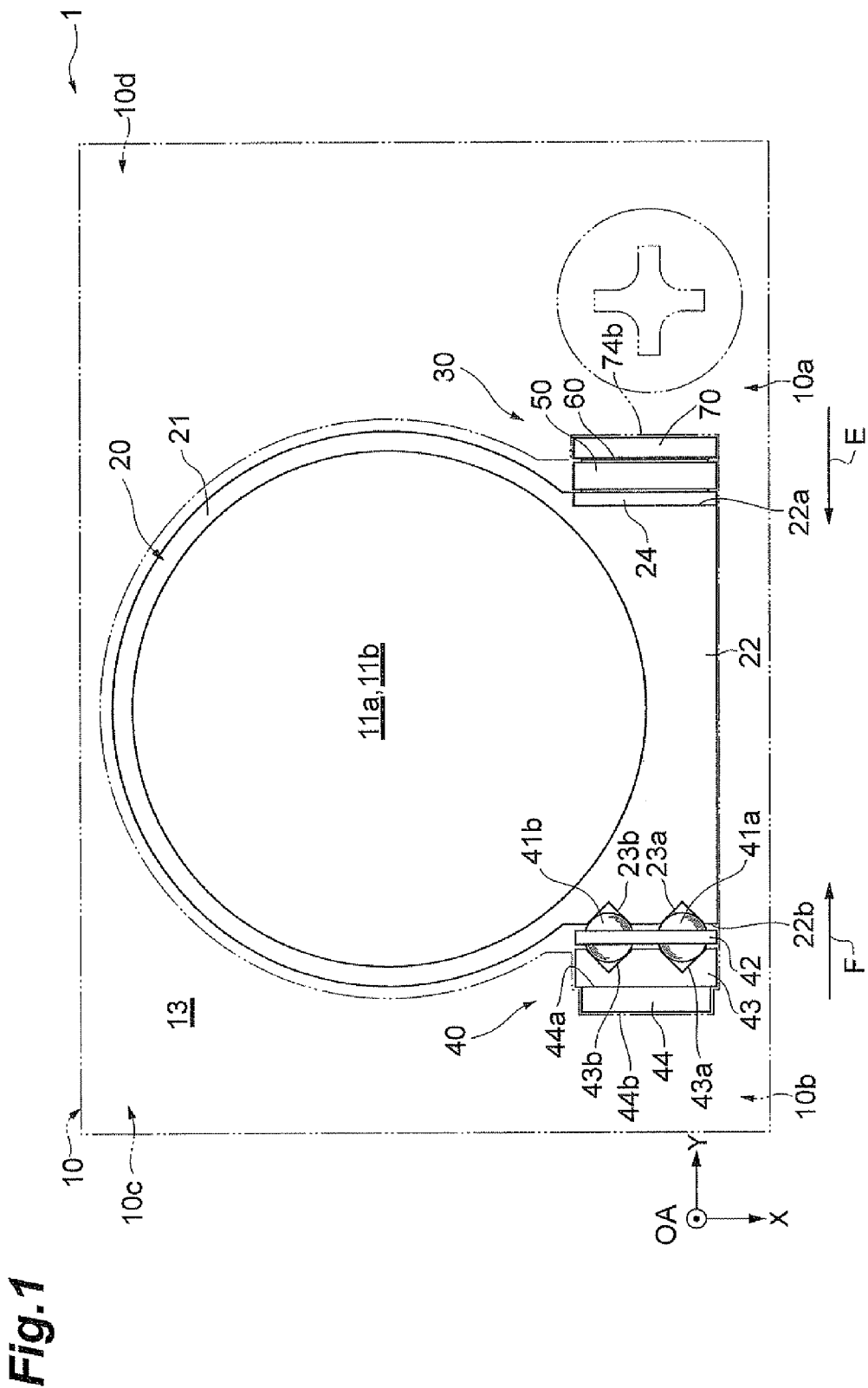
FIG. 1 is a plan view illustrating the lens drive device in accordance with an embodiment.

As illustrated in FIG. 1, a lens drive device 1 comprises a housing 10 constituted by a base and a cover, a lens holder 20, a piezoelectric actuator unit 30, and an biasing unit 40. The lens drive device 1 is a device configured to drive a lens for a camera mounted to a mobile phone or the like. The lens drive device 1 is configured to have a two-dimensional form of 8.5 mm×8.5 mm, for example.

The housing 10 contains therein the lens holder 20, piezoelectric actuator unit 30, and biasing unit 40. The base of the housing 10 has a bottom formed with an opening 11a shaped into a perfect circle and a side wall 13 rising from the bottom. The base (bottom) has a rectangular form when seen as a plane. Therefore, the base has four corners 10a to 10d as illustrated in FIG. 1. When seen in an optical axis OA of the lens, the corner 10a is adjacent to the corners 10b, 10d, the corner 10b is adjacent to the corners 10a, 10c, the corner 10c is adjacent to the corners 10b, 10d, and the corner 10d is adjacent to the corners 10a, 10c.

The side wall 13 is formed over the four sides of the bottom and integrated with the bottom. The bottom and the side wall 13 demarcate a space for containing the lens holder 20. The base is formed by a liquid crystal polymer containing fillers made of glass fibers, inorganic matters, and the like, for example. The rectangular form encompasses not only forms having right angle corners, but those having chamfered corners as well.

The cover of the housing 10 has a hollow rectangular 20, parallelepiped form opening on one surface side. The cover has a surface opposing the bottom and side face parts respectively extending from the four sides of the surface part. An opening 11b shaped into a perfect circle is formed at a position opposing the opening 11a. The side face part is formed with an opening (not depicted), which fits onto a lug (not depicted) formed on the outer face of the side wall 13 of the base, whereby the cover is attached to the base. The cover is formed by SPCC (cold-rolled steel), for example.

The lens holder 20 has a cylindrical barrel 21 and is arranged within an accommodation space demarcated by the bottom and the side wall 13. The inner and outer peripheral surfaces of the barrel 21 have respective cross sections formed into perfect circles. A lens barrel (not depicted) containing a lens is attached to the inside of the barrel 21. The lens holder 20 has the lens barrel attached thereto, so as to hold the lens. The lens held by the lens barrel is exposed through the opening 11a of the cover and the opening 11b of the cover. The lens holder 20 is formed by a carbon-fiber-containing liquid crystal polymer or nylon, for example.

Figure 2:
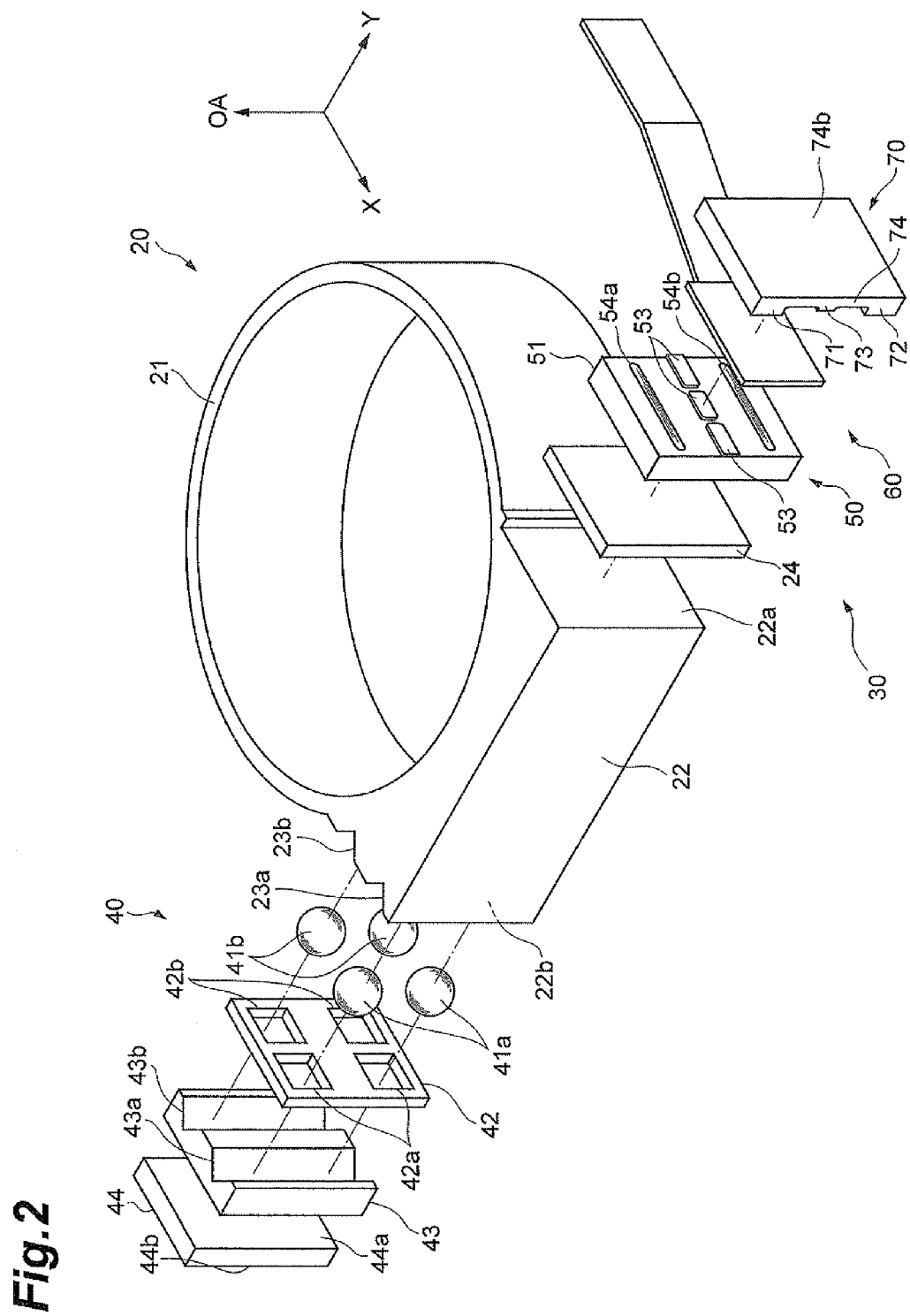
FIG. 2 is an exploded perspective view illustrating a part of the lens drive device in accordance with the embodiment.

As illustrated in FIGS. 1 and 2, the lens holder 20 has a projection 22 projecting outward from the outer peripheral surface of the barrel 21 in a first direction X orthogonal to the optical axis OA of the lens. The first direction X into which the projection 22 projects coincides with a radial direction of the barrel 21 in this embodiment. The projection 22 extends in a second direction Y (direction tangential to the barrel 22 when seen in the optical axis OA of the lens) orthogonal to the optical axis OA of the lens and the first direction X. In this embodiment, the width of the projection 22 in the second direction Y is configured such as to become larger than the radius of the barrel 21 but smaller than the diameter thereof.

In the state where the lens holder 20 is mounted to the base of the housing 10, the projection 22 is located between the corners 10a, 10b of the base. As illustrated in FIGS. 1 and 2, the projection 22 has side wall faces 22a, 22b located at the corners 10a, 10b of the base, respectively. The side wall faces 22a, 22b project out of the barrel 21 along the first direction X. The side wall faces 22a, 22b oppose each other in the second direction Y.

The side wall face 22b is formed with a pair of grooves 23a, 23b extending along the optical axis OA of the lens. The grooves 23a, 23b are adjacent to each other in the first direction X. Each of the grooves 23a, 23b has a V-shape which becomes narrower as it goes deeper when seen in the optical axis OA of the lens. Therefore, a ball member 41a, which will be explained later, engaging the groove 23a comes into contact therewith at two points, while a ball member 41b, which will be explained later, engaging the groove 23b comes into contact therewith at two points.

The lens holder 20 has a flat substrate 24 touching frictional parts 52a, 52b of a piezoelectric actuator 50 which will be explained later. The substrate 24 is fixed to the side wall face 22a of the projection 22. This allows the substrate 24 to function substantially as a side face of the projection 22 (the side face of the lens holder 20). The substrate 24 is constituted by SiC, zirconia, or the like. The substrate 24 may be formed integrally with the lens holder 20.

As illustrated in FIGS. 1 and 2, the piezoelectric actuator unit 30 has the piezoelectric actuator 50 and a back member 70. The piezoelectric actuator unit 30 is located at the corner 10a of the base.

Figure 3:
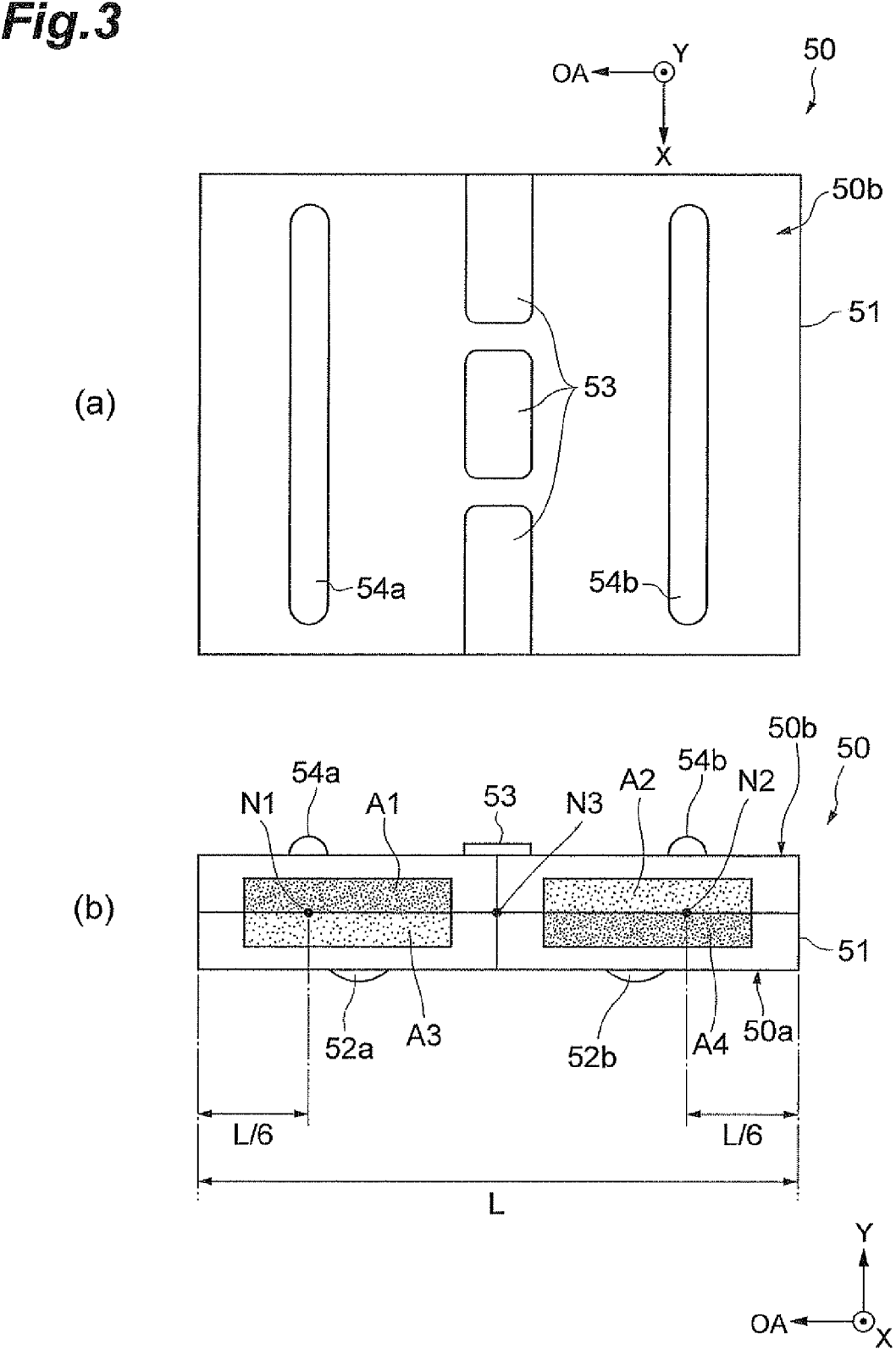

The piezoelectric actuator 50, which is constituted by an element 51 having a rectangular parallelepiped form (see FIG. 3) and a flexible printed board 60, is arranged near the substrate 24. The piezoelectric actuator 50 has a pair of first and second main faces 50a, 50b opposing each other. The element 51 is a so-called multilayer piezoelectric element. The element 51 is configured to have a length of about 2.5 mm, for example. The element 51 is configured to have a thickness of about 0.5 mm, for example. The element 51 is configured to have a width of about 1.8 mm, for example. As illustrated in FIG. 3(b), the element 51 has therewithin a plurality of (four in this embodiment) active parts A1 to A4 which expand and contract according to a voltage value applied.

On the first main face 50a side of the element 51, a plurality of (two in this embodiment) frictional parts 52a, 52b are placed along the arranging direction of the active parts A1 to A4. When seen from the first and second main faces 50a, 50b, outer electrodes 53 and a pair of protrusions 54a, 54b are formed on the second main face 50b so as to correspond to positions where the expansion and contraction become the smallest (node points).

The frictional parts 52a, 52b, each having a semi-cylindrical form, are arranged with a gap therebetween in the optical axis OA of the lens (arranging direction of the active parts A1 to A4) and extend along the first direction X (direction orthogonal to the arranging direction of the active parts A1 to A4 and the opposing direction of the first and second main faces 50a, 50b). The frictional parts 52a, 52b come into contact with the substrate 24, thereby indirectly touching the outer peripheral surface of the lens holder 20 (the side wall face 22a of the projection 22). Each of the frictional parts 52a, 52b is configured to have a height of about 50 μm. The surfaces of the frictional parts 52a, 52b constitute a part of the first main face 50a of the piezoelectric actuator 50. That is, the first main face 50a is an uneven surface constituted by a combination of the surface of the element 51 and the surfaces of the frictional parts 52a, 52b in this embodiment.

When driven, the element 51 has two resonance modes. Specifically, the element 51 is vibrated by superposition of a longitudinal vibration mode (first vibration mode) vibrating in the longitudinal direction of the element 51 (arranging direction of the active parts A1 to A4) and a bending vibration mode (second vibration mode) into the thickness direction of the element 51 (opposing direction of the first and second main faces 50a, 50b).

Driving the first active part A1 constituted by a first inner electrode, a grounding inner electrode, and a piezoelectric layer and the active part A4 constituted by a fourth inner electrode, a grounding inner electrode, and a piezoelectric layer expands the active parts A1, A4 and contracts the active parts A2, A3, so as to release the frictional part 52a from the substrate 24 and bring the frictional part 52b into contact with the substrate 24, thereby generating a frictional force between the frictional part 52b and the substrate 24. The frictional force generated between the frictional part 52b and the substrate 24 moves the substrate 24 along the optical axis OA of the lens.

Driving the active part A2 constituted by a second inner electrode, a grounding inner electrode, and a piezoelectric layer and the active part A3 constituted by a third inner electrode, a grounding inner electrode, and a piezoelectric layer expands the active parts A2, A3 and contracts the active parts A1, A4, so as to release the frictional part 52b from the substrate 24 and bring the frictional part 52a into contact with the substrate 24, thereby generating a frictional force between the frictional part 52a and the substrate 24. The frictional force generated between the frictional part 52a and the substrate 24 moves the substrate 24 along the optical axis OA of the lens in a direction opposite to that caused by the frictional part 52b.

Driving the element 51 by applying voltages having phases shifted from each other by 90° to the outer electrodes 53, 53 connected to the first and second inner electrodes, respectively, generates elliptical movements having phases shifted from each other by 180° to the frictional parts 52a, 52b, respectively, so that frictional forces therefrom alternately act on the substrate 24, thereby moving the substrate 24 (lens holder 20). That is, the frictional parts 52a, 52b drive the lens holder 20 along the optical axis OA of the lens. As a result, the piezoelectric actuator 50 provides a drive force toward the side wall face 22a of the projection 22 through the substrate 24.

In the example illustrated in FIG. 3(b), the element 51 has three node points N1 to N3. In a boundary part between the active parts A1, A3, the node point N1 is located at about L/6 inside from an end part of the element 51, where L is the length of the element 51 in the longitudinal direction thereof (arranging direction of the active parts A1 to A4). In a boundary part between the active parts A2, A4, the node point N2 is located at about L/6 inside from an end part of the element 51. The node point N3 is in a center part in the longitudinal direction of the element 51 and in a center part in the thickness direction thereof. Hence, the node point N3 is located between the node points N1 and N2. The node points N1, N2 are points representing the smallest displacement in the thickness direction, while representing displacements in the longitudinal direction of the element 51. The node point N3 is a point representing the smallest displacement in both of the longitudinal and thickness directions of the element 51.

A plurality of (three in this embodiment) outer electrodes 53, each having a rectangular form, are located on the second main face 50b of the element 51. The outer electrodes 53, each extending along the first direction X (direction orthogonal to the arranging direction of the active parts A1 to A4 and the opposing direction of the first and second main faces 50a, 50b), are arranged in series while being separated from each other in the first direction X. The outer electrodes 53 are located on the second main face 50b so as to overlap the node point N3 when seen in the opposing direction of the first and second main faces 50a, 50b. The outer electrodes 53 are configured to have a thickness of about 2 µm, for example.

Each of the protrusions 54a, 54b has a semi-cylindrical form and projects outward from the second main face 50b. Both of the protrusions 54a, 54b extend along the first direction X (direction orthogonal to the arranging direction of the active parts A1 to A4 and the opposing direction of the first and second main faces 50a, 50b). The protrusions 54a, 54b are located so as to hold the outer electrodes 53 therebetween on the second main face 50b of the element 51. The surfaces of the protrusions 54a, 54b constitute a part of the second main face 50b of the piezoelectric actuator 50.

The protrusion 54a is located on the second main face 50b so as to overlap the node point N1 when seen in the opposing direction of the first and second main faces 50a, 50b. The protrusion 54b is located on the second main face 50b so as to overlap the node point N2 when seen in the opposing direction of the first and second main faces 50a, 50b. Both of the protrusions 54a, 54b, each of which preferably has some hardness and a smooth surface, can be formed by printing with a silicone resin as a material, for example. Using the printing as a method of making the protrusions 54a, 54b can reduce fluctuations in their height. The protrusions 54a, 54b, which are set higher than the outer electrodes 53 in this embodiment, are configured to have a height of about 30 µm each, for example.

Returning to FIG. 2, the flexible printed board 60 has a film-shaped insulator and a wiring part arranged on the insulator. The wiring part includes respective leads connected to the outer electrodes 53 by soldering or the like. The flexible printed board 60 is arranged along one side of the base (side wall 13). In this embodiment, the flexible printed board 60 is arranged so as to bridge the corners 10a and 10d.

One end part on the corner 10a side of the flexible printed board 60 is mounted to the element 51. The other end part (not depicted) on the corner 10d side of the flexible printed board 60 is fixed to the side wall 13 by bonding or the like and positioned with respect to the base, the lens holder 20, and the like. This end part is lead to the outside of the lens drive device 1 through a gap formed between the base and the cover.

The rear face of the surface on which the element 51 is mounted in one end part of the flexible printed board 60 constitutes a part of the second main face 50b of the piezoelectric actuator 50 in this embodiment. That is, the second main face 50b is an uneven surface constituted by a combination of the surface of the element 51, the surfaces of the protrusions 54a, 54b, and the rear face in one end part of the flexible printed board 60 in this embodiment.

Figure 4:
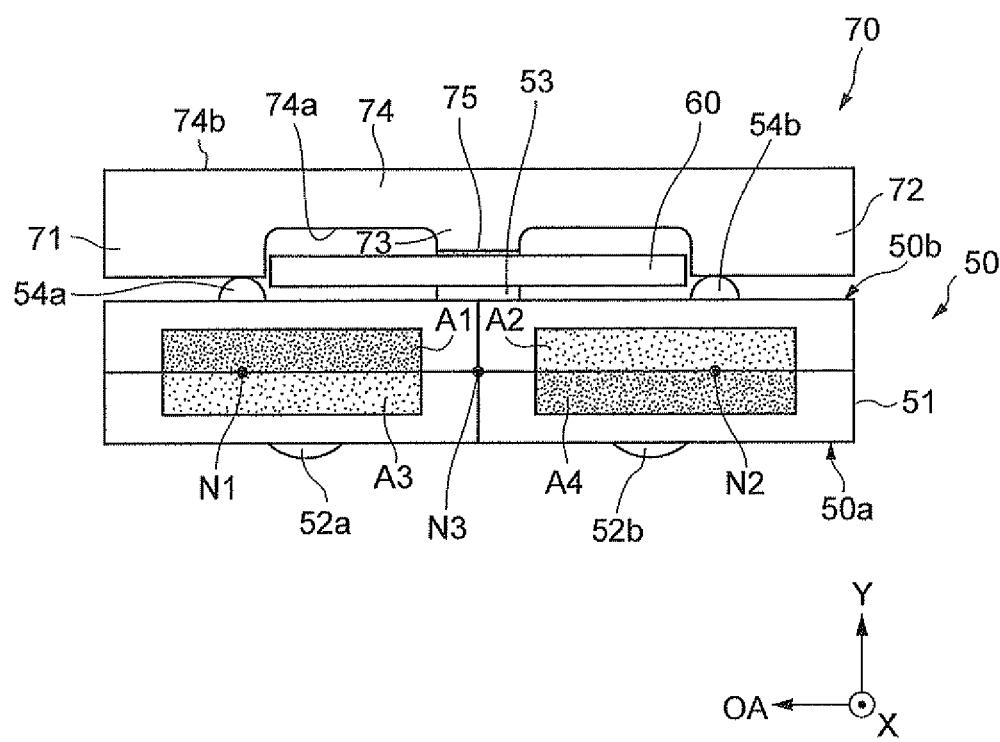
FIG. 4 is a side view illustrating the piezoelectric actuator and a back member.

As illustrated in FIGS. 2 and 4, the back member 70 is arranged on the rear face in one end part of the flexible printed board 60. That is, the back member 70 is located on the second main face 50b side. The back member 70 is preferably constructed by a material which is hard to deform, such as a metal or a ceramics. When constructed by a metal, the back member 70 is shaped into a predetermined form by etching or the like. When constructed by a ceramics, the back member 70 is shaped into a predetermined form by processing with a dicer or the like.

Figure 5:
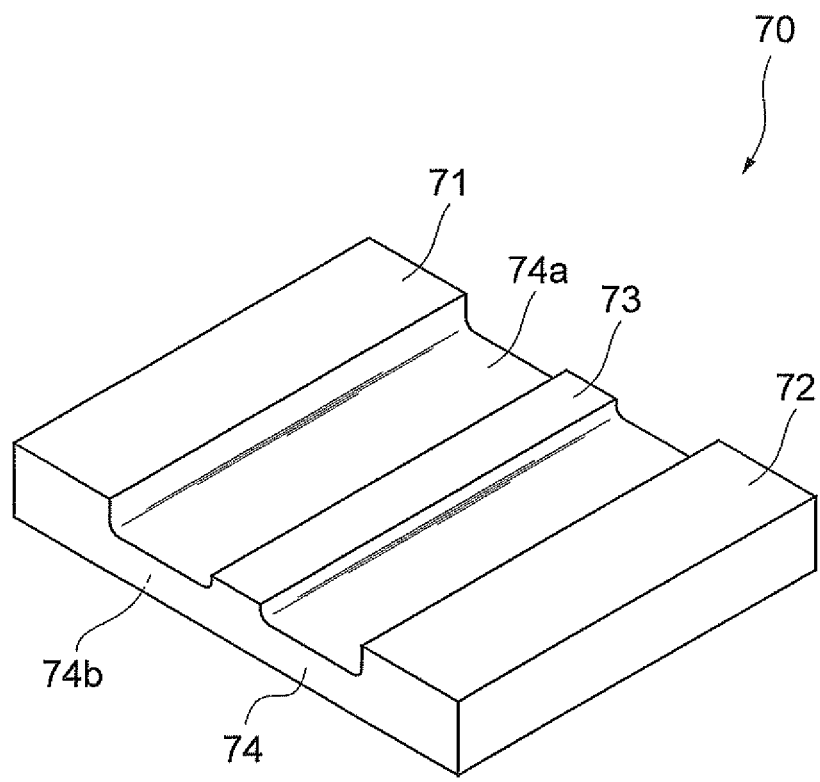
FIG. 5 is a perspective view illustrating the back member.

As illustrated in FIGS. 4 and 5, the back member 70 has first to third projections 71 to 73 projecting to the second main face 50b. That is, the back member 70 has such a structure that the first to third projections 71 to 73 project from one surface 74a of a flat part 74 having a rectangular form. The flat part 74 is configured to have a thickness of about 170 µm, for example. The first and second projections 71, 72 are configured to have a thickness of about 130 µm each, for example. The third projection 73 is configured to have a thickness of about 60 µm, for example. This makes the first and second projections 71, 72 higher than the third projection 73 in this embodiment.

The first to third projections 71 to 73, each having a rectangular parallelepiped form, extend along the first direction X. The first and second projections 71, 72 are located on both end sides of one surface 74a in the optical axis OA of the lens, while the third projection 73 is located between the first and second projections 71, 72.

As illustrated in FIG. 4, the first projection 71 is in contact with the vertex of the protrusion 54a. As a consequence, the first projection 71 overlaps the node point N1 when seen in the second direction Y (opposing direction of the first and second main faces 50a, 50b). The first projection 71 is not bound to the protrusion 54a by bonding or the like. Therefore, the first projection 71 can move along the optical axis OA of the lens such as to slide on the surface of the protrusion 54a. That is, the first projection 71 is slidable with respect to the second main face 50b.

The second projection 72 is in contact with the vertex of the protrusion 54b. As a consequence, the second projection 72 overlaps the node point N2 when seen in the second direction Y (opposing direction of the first and second main faces 50a, 50b). The second projection 72 is not bound to the protrusion 54b by bonding or the like. Therefore, the second projection 72 can move along the optical axis OA of the lens such as to slide on the surface of the protrusion 54b. That is, the second projection 72 is slidable with respect to the second main face 50b. Hence, no drags which inhibit the first and second projections 71, 72 from moving along the second main face 50b are generated between the first and second projections 71, 72 and the second main face 50b.

The third projection 73 overlaps the outer electrode 53 and node point N3 when seen in the second direction Y (opposing direction of the first and second main faces 50a, 50b). The third projection 73 is bonded to the rear face in one end part of the flexible printed board 60 with an adhesive 75 such as a silicone resin. As a consequence, the third projection 73 is bound to the second main face 50b through the flexible printed board 60 and outer electrodes 53. Therefore, a drag which inhibits the third projection 73 from moving along the second main face 50b is generated between the third projection 73 and the second main face 50b. That is, the drag generated between the first and second projections 71, 72 and the second main face 50b is lower than that generated between the third projection 73 and the second main face 50b. This makes the first and second projections 71, 72 easier to move than the third projection 73 with respect to the second main face 50b.

The other surface 74b of the back member 70 is fixed directly or indirectly to the side wall 13 of the housing with an adhesive or the like.

A drag E (see FIG. 1) of the back member 70 caused by an elastic force F of an biasing member 44 (which will be explained later) is transmitted to the piezoelectric actuator 50 through the first to third projections 71 to 73 of the back member 70. As a consequence, the first projection 71 is pressed against the piezoelectric actuator 50 at a position corresponding to the node point N1 when seen in the second direction Y (opposing direction of the first and second main faces 50a, 50b). The second projection 72 is pressed against the piezoelectric actuator 50 at a position corresponding to the node point N2 when seen in the second direction Y (opposing direction of the first and second main faces 50a, 50b). The third projection 73 is pressed against the piezoelectric actuator 50 at a position corresponding to the node point N3 when seen in the second direction Y (opposing direction of the first and second main faces 50a, 50b).

The piezoelectric actuator 50 and the back member 70 constitute a piezoelectric actuator unit. As illustrated in FIG. 4, the flexible printed board 60 is located between the third projection 73 and element 51 in the second direction Y and between the first projection 71 (the protrusion 54a) and the second projection 72 (the protrusion 54b) in the optical axis OA of the lens.

Returning to FIGS. 1 and 2, the biasing unit 40 has a plurality of (two in this embodiment) ball members 41a, a plurality of (two in this embodiment) ball members 41b, a holding member 42, a plate member 43, and the biasing member 44. The biasing unit 40 is located at the corner 10b of the base.

The two ball members 41a, both engaging the groove 23a, are arranged in a row along the optical axis OA of the lens. The two ball members 41b, both engaging the groove 23b, are arranged in a row along the optical axis OA of the lens. Since the ball members 41a, 41b engage the grooves 23a, 23b, respectively, the lens holder 20 can be moved along the optical axis OA of the lens without tilting therefrom. The ball members 41a, 41b have diameters on a par with each other and are constituted by stainless steel, for example.

The holding member 42 is a flat member having a rectangular form. The holding member 42 is formed with a pair of holding holes 42a corresponding to the two ball members 41a and a pair of holding holes 42b corresponding to the two ball members 41b. Each of the holding holes 42a has a square form with a size slightly larger than the diameter of the ball member 41a. This allows the holding hole 42a to hold the ball member 41a rotatably. Each of the holding holes 42b has a square form with a size slightly larger than the diameter of the ball member 41b. This allows the holding hole 42b to hold the ball member 41b rotatably. The holding member 42 is constituted by stainless steel, for example.

The plate member 43 is a flat member having a rectangular form. The plate member 43 is formed with a pair of grooves 43a, 43b extending along the optical axis OA of the lens. The grooves 43a, 43b are adjacent to each other in the first direction X. Each of the grooves 43a, 43b has a V-shape which becomes narrower as it goes deeper when seen in the optical axis OA of the lens. Therefore, the ball member 41a engaging the groove 43a comes into contact therewith at two points, while the ball member 41b engaging the groove 43b comes into contact therewith at two points. The plate member 43 is constituted by a liquid crystal polymer or nylon, for example.

The biasing member 44, which is a rectangular elastic plate elastically deformable in this embodiment, applies the biasing force (elastic force) F to the side wall face 22b of the projection 22 (lens holder 20) through the plate member 43 and ball members 41a, 41b as illustrated in FIG. 1. One surface 44a of the biasing member 44 is in contact with the surface of the plate member 43 opposite to that formed with the grooves 43a, 43b.

These surfaces may be bonded with an adhesive or the like or simply in contact with each other. The other surface 44b of the biasing member 44 is fixed directly or indirectly to the side wall 13 of the housing with an adhesive or the like. The biasing member 44 is preferably constituted by various elastic materials composed of resins such as silicone rubber. Using such an elastic material as the biasing member 44 can be effective in absorbing vibrations excited by the element 51 so as to suppress noises and absorbing shocks applied to the lens drive device 1 so as to inhibit cracks from occurring in the element 51.

As illustrated in FIGS. 1 and 2, the biasing member 44, the plate member 43, the ball members 41a, 41b, the projection 22 of the lens holder 20, the substrate 24, the piezoelectric actuator 50, the flexible printed board 60, and the back member 70 are arranged sequentially along the direction of the biasing force F caused by the biasing member 44 in this embodiment. Therefore, the position receiving the biasing force F from the biasing member 44 and the position receiving the drive force from the piezoelectric actuator 50 oppose each other through the projection 22 in the lens holder 20, while the biasing force F caused by the biasing member 44 is directed to the piezoelectric actuator 50.

As in the foregoing, when seen in the opposing direction of the first and second main faces 50a, 50b, the first to third projections 71 to 73 of the back member 70 are pressed against the second main face 50b of the piezoelectric actuator 50 at the respective positions corresponding to the node points N1 to N3 in this embodiment. The drag generated between the first and second projections 71, 72 and the second main face 50b is lower than that generated between the third projection 73 and the second main face 50b. At the node points N1, N2, the displacement in the opposing direction of the first and second main faces 50a, 50b is the smallest, while the drag generated between the first and second projections 71, 72 and the second main face 50b is lower, whereby vibrations, if any, of the piezoelectric actuator 50 in directions (along the lens axis OA of the lens) orthogonal to the first and second main faces 50a, 50b are hard to be inhibited by the first and second projections 71, 72. At the node point N3, on the other hand, the displacement in the opposing direction of the first and second main faces 50a, 50b is the smallest and the displacement in directions (along the lens axis OA of the lens) orthogonal to the opposing direction is the smallest, whereby vibrations of the piezoelectric actuator 50 are hard to be inhibited by the third projection 73 even when the drag generated between the third projection 73 and the second main face 50b is higher. Since three projections, i.e., the first to third projections 71 to 73, are pressed against the second main face 51b, the frictional parts 52a, 52b can be brought into uniform contact with the lens holder 20, which is an object to be driven. As a result, the drive force can efficiently be transmitted from the piezoelectric actuator 50 to the lens holder 20, while the piezoelectric actuator 50 can be driven with high accuracy.

In this embodiment, the piezoelectric actuator 50 has the flexible printed board 60 located between the third projection 73 and the second main face 50b and electrically connected to the element 51. The flexible printed board 60 has flexibility and thus can move so as to follow vibrations, if any, of the element 51. This can easily connect the flexible printed board 60 and the element 51 electrically to each other and favorably keep the electric connection between the element 51 and the flexible printed board 60.

In this embodiment, the third projection 73 is pressed against the flexible printed board 60 constituting a part of the second main face 50b. The flexible printed board 60 has flexibility and provides a buffer action against vibrations of the element 51. This makes it harder to inhibit the element 51 from vibrating even when the drag generated between the third projection 73 and the second main face 50b is higher.

In this embodiment, the first and second projections 71, 72 are slidable with respect to the second main face 50b. Therefore, vibrations, if any, of the element 51 in directions (along the optical axis OA) orthogonal to the opposing direction of the first and second main faces 50a, 50b are hardly inhibited by the first and second projections 71, 72.

In this embodiment, the piezoelectric actuator 50 has the first and second protrusions 54a, 54b protruding outward from the second main face 50b, while the first and second projections 71, 72 are in contact with the first and second protrusions 54a, 54b, respectively. The surface of the first protrusion 54a opposing the first projection 71 constitutes a part of the second main face 50b, while the surface of the second protrusion 54b opposing the second projection 72 constitutes a part of the second main face 50b. Therefore, setting the first and second protrusions 54a, 54b to a desirable height can adjust the balance of loads applied from the first and second projections 71, 72 in contact with the first and second protrusions 54a, 54b, respectively, to the piezoelectric actuator 50. This can bring the frictional parts 52a, 52b into more uniform contact with the lens holder 20.

In this embodiment, the biasing member 44 provides the lens holder 20 with the biasing force toward the piezoelectric actuator 50 through the ball members 41a, 41b. This can favorably keep the contact state between the lens holder 20 and the piezoelectric actuator 50. The position to which the biasing force is applied by the biasing member 44 and the position at which the drive force is applied by the piezoelectric actuator 50 oppose each other through the projection 22 of the lens holder 20 interposed therebetween, while the biasing force by the biasing member 44 is directed to the piezoelectric actuator 50. Hence, the biasing member 44 is not located on the drive force transmission path from the piezoelectric actuator 50 to the lens holder 20, whereby losses are hard to be generated in transmission of the drive force from the piezoelectric actuator 50 to the lens holder 20. Since the biasing force by the biasing member 44 can be applied to the projection 22 having high rigidity, the contact state between the lens holder 20 and the piezoelectric actuator 50 becomes better, while making it easier to transmit the drive force from the piezoelectric actuator 50 to the lens holder 20. Since the ball members 41a, 41b engage their corresponding grooves 23a, 23b and 43a, 43b, so as to guide the lens holder 20 along the optical axis OA, without using a shaft which is likely to generate a frictional force between it and a through hole as in the prior art, losses are harder to be generated in transmission of the drive force from the piezoelectric actuator 50 to the lens holder 20 in this embodiment. As a result of these, the drive force from the piezoelectric actuator 50 is efficiently transmitted to the lens holder 20.

This embodiment further comprises the housing 10 for containing the lens holder 20, piezoelectric actuator unit 30, and biasing unit 40. The piezoelectric actuator 50 is arranged at the corner 10a of the housing 10, while the biasing member 44 is arranged at the corner 10b adjacent to the corner 10a of the housing 10. The projection 22 has a pair of side wall faces 22a, 22b which oppose each other in the extending direction of the projection 22 (second direction Y) and are located at the corners 10a, 10b, respectively. The piezoelectric actuator 50 provides the drive force toward the side wall face 22a, while the biasing member 44 provides the biasing force toward the side wall face 22b. Hence, the piezoelectric actuator 50 and biasing member 44 are arranged at corners which form dead spaces in the housing 10. The drive force is provided by the piezoelectric actuator 50 within the corner 10a, while the biasing force is provided by the biasing member 44 within the corner 10b. Therefore, even when the lens holder 20 becomes larger, areas for members for providing the drive force and biasing force are secured in dead spaces, whereby the drive force and biasing force are not inhibited from being applied to the lens holder 20. Therefore, the lens holder 20 and the lens drive device 1 can be made larger and smaller, respectively, at the same time. As a result, when the lens holder 20 is configured such as to have a size on a par with the conventional one, the lens drive device 1 can be obtained with a small size. When the lens drive device 1 is configured such as to have a size on a par with the conventional one, on the other hand, the lens holder 20 can be made larger, whereby a lens having a larger diameter can be mounted to the lens holder 20.

Though a preferred embodiment of the present invention is explained in the foregoing, the present invention is not limited to the above-mentioned embodiment. For example, the biasing unit 40 in a mode integrating a function to hold the ball members 41a, 41b and a function to generate an biasing force may be used in place of the holding member 42, plate member 43, and biasing member 44.

Figure 6:
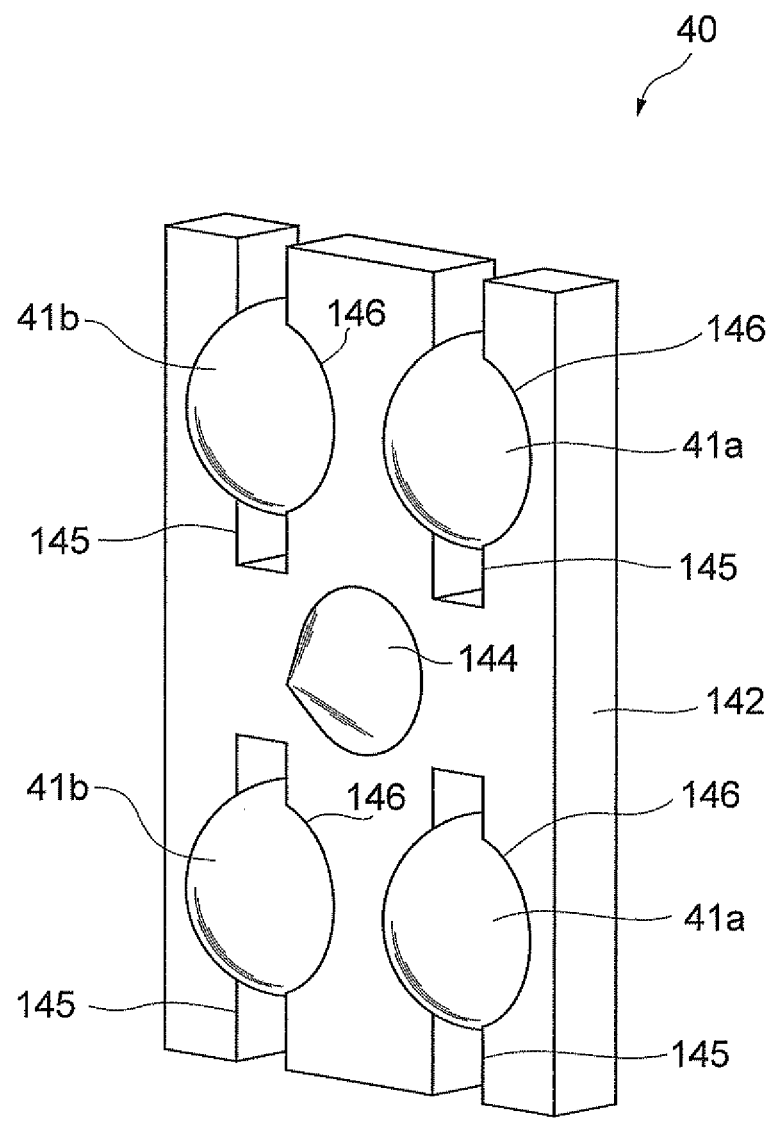
FIG. 6 is a perspective view illustrating another example of an biasing unit.

Specifically, as illustrated in FIG. 6, the biasing unit 40 comprises ball members 41a, 41b and a holder base 142. A conical protrusion 144 protruding outward (toward the side wall 13) is formed at a center part of one surface of the holder base 142. The holder base 142 and protrusion 144 can be constructed by various elastic materials such as polyacetal. This allows the protrusion 144 to exhibit a function to generate an biasing force in place of the biasing member 44. The protrusion 144 may have various forms such as cylindrical, pyramidal, and prismatic forms in place of the conical form. The holder base 142 may be formed with a plurality of protrusions 144, which are preferably arranged such as to apply an biasing force (elastic force) uniformly to the lens holder 20.

The holder base 142 is formed with four slits 145 penetrating therethrough and extending longitudinally thereof. Among the four slits 145, two slits located between the protrusion 144 and one longitudinal end part of the holder base 142 both extend from near the center of the holder base 142 to the one end part. Among the four slits 145, two slits located between the protrusion 144 and the other longitudinal end part of the holder base 142 both extend from near the center of the holder base 142 to the other end part.

Holding holes 146 for holding the respective ball members 41a, 41b are formed in the thickness direction of the holder base 142 so as to overlap their corresponding slits 145. Each of the holding holes 146 has a spherical inner face. The holding holes 146 are slightly larger than their corresponding ball members 41a, 41b. Therefore, the ball members 41a, 41b are rotatably held by the holding holes 146 without dropping out.

Using thus constructed biasing unit 40 makes the holding member 42, plate member 43, and biasing member 44 unnecessary, whereby the lens drive device 1 can be made smaller. The slits 145, which are used for making it easier for the ball members 41a, 41b to fit in the holding holes 146, may be omitted from the holding base 142. In this case, pushing the ball members 41a, 41b into the holding holes 146 allows the latter to hold the former.

Figure 7:
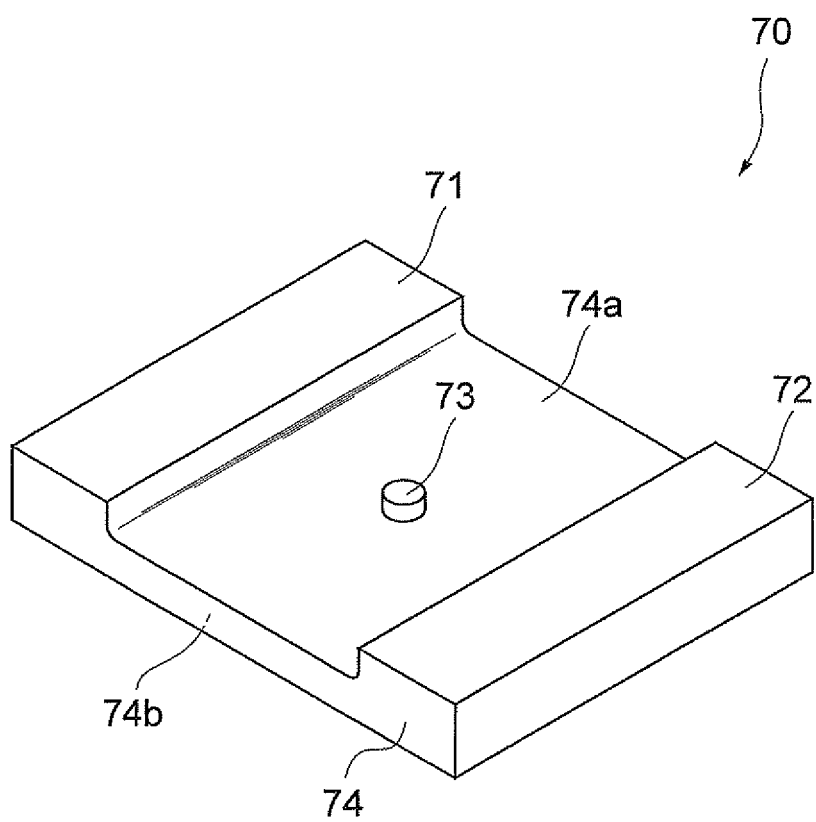
FIG. 7 is a perspective view illustrating another example of the back member.

A back member 70 having a structure different from that of the above-mentioned embodiment may be used. Specifically, the third projection 73 may be a protuberance projecting from near the center of one surface 74a of the flat part 74 without extending along the first direction X. FIG. 7 illustrates an example in the case where the protuberance is cylindrical. This greatly reduces the area by which the third projection 73 is bonded to the flexible printed board 60 and thus can lower the force by which the third projection 73 binds the second main face 50b. Therefore, vibrations of the element 51 are harder to be inhibited.

The flexible printed board 60 may be free of electric connections with the element 51. In this case, the third projection 73 of the back member 70 comes into direct contact with the element 51. The piezoelectric actuator 50 may be free of the protrusions 54a, 54b. In this case, the first and second projections 71, 72 of the back member 70 come into direct contact with the element 51. That is, pressing the first to third projections 71 to 73 against the second main face 50b at the respective positions corresponding to the node points N1 to N3 when seen in the opposing direction of the first and second main faces 50a, 50b encompasses the cases where they are pressed against the element 51 directly and against the protrusions 54a, 54b and flexible printed board 60.

Though the above-mentioned embodiment uses an elastic plate as the biasing member 44, various biasing members such as coil springs and leaf springs can be employed therefor.

The first and second projections 71, 72, which are not bonded to but simply in contact with the protrusions 54a, 54b, respectively, in the above-mentioned embodiment may be attached thereto by bonding or the like. In embodiments in which the piezoelectric actuator 50 is free of the protrusions 54a, 54b, the first and second projections 71, 72 may be attached to the second main face 50b by bonding or the like. Even in these cases, the drag generated between the first and second projections 71, 72 and the second main face 50b is lower than that generated between the third projection 73 and the second main face 50b. This makes the first and second projections 71, 72 easier to move than the third projection 73 with respect to the second main face 50b.

What is claimed is:

1. A lens drive device comprising:
   a lens holder configured to hold a lens;
   an actuator configured to apply a drive force to the lens holder so as to move the lens holder along an optical axis of the lens;
   first and second ball members held rotatably; and
   a biasing member configured to apply a biasing force to the lens holder toward the actuator through the first and second ball members;
   wherein the lens holder has a barrel configured to hold the lens and a projection projecting outward from an outer peripheral surface of the barrel and extending in a direction intersecting the projecting direction and optical axis;
   wherein the outer peripheral surface of the projection is formed with a first groove extending along the optical axis and engaging the first ball member and a second groove extending along the optical axis and engaging the second ball member; and
   wherein a position receiving the biasing force from the biasing member and a position receiving the drive force from the actuator in the lens holder oppose each other through the projection interposed therebetween.

2. A lens drive device according to claim 1, wherein the actuator has an element configured to generate the drive force and a flexible printed board electrically connected to the element.

3. A lens drive device according to claim 1, further comprising a back member configured to press the actuator;
   wherein the biasing member, the first and second ball members, the projection, the actuator, and the back member are arranged sequentially along the direction of the biasing force by the biasing member.

4. A lens drive device according to claim 3, wherein the actuator is a piezoelectric actuator having first and second main faces opposing each other and a frictional part located on the first main face side of the element and configured to apply the drive force to the lens holder;
   wherein the element is deformable in an opposing direction of the first and second main faces and a direction orthogonal to the opposing direction;
   wherein the back member is located on the second main face side;
   wherein the piezoelectric actuator has:
      a pair of first and second node points representing the smallest displacement in the opposing direction, and
      a third node point, located between the first and second node points, representing the smallest displacement in the opposing direction and the smallest displacement in a direction orthogonal to the opposing direction;
   wherein the back member has first to third projections projecting to the second main face;
   wherein the first to third projections are pressed against the second main face at respective positions corresponding to the first to third node points when seen in the opposing direction;
   wherein respective drags configured to inhibit the first to third projections from moving along the second main face are generated between the first to third projections and the second main face; and
   wherein the drags generated between the first and second projections and the second main face is lower than the drag generated between the third projection and the second main face.

5. A lens drive device according to claim 1, further comprising a housing configured to contain the lens holder, the actuator, and the biasing member;
   wherein the actuator is arranged at a first corner of the housing;
   wherein the biasing member is arranged at a second corner of the housing adjacent to the first corner;
   wherein the projection has a pair of first and second surfaces opposing each other in the extending direction of the projection;
   wherein the first and second surfaces are located at the first and second corners, respectively;
   wherein the actuator provides the drive force toward the first surface; and
   wherein the biasing member provides the biasing force toward the second surface.

6. A lens drive device according to claim 1, wherein the biasing member has a first holding hole configured to rotatably hold the first ball member and a second holding hole configured to rotatably hold the second ball member.

* * * * *